Aug. 27, 1957 L. V. BJONG ET AL 2,804,594
TEST APPARATUS

Filed March 30, 1953 3 Sheets—Sheet 1

INVENTORS
LEO V. BJONG
CHARLES F. SCHAFER
BY *Oscar B Brumback*
ATTORNEY

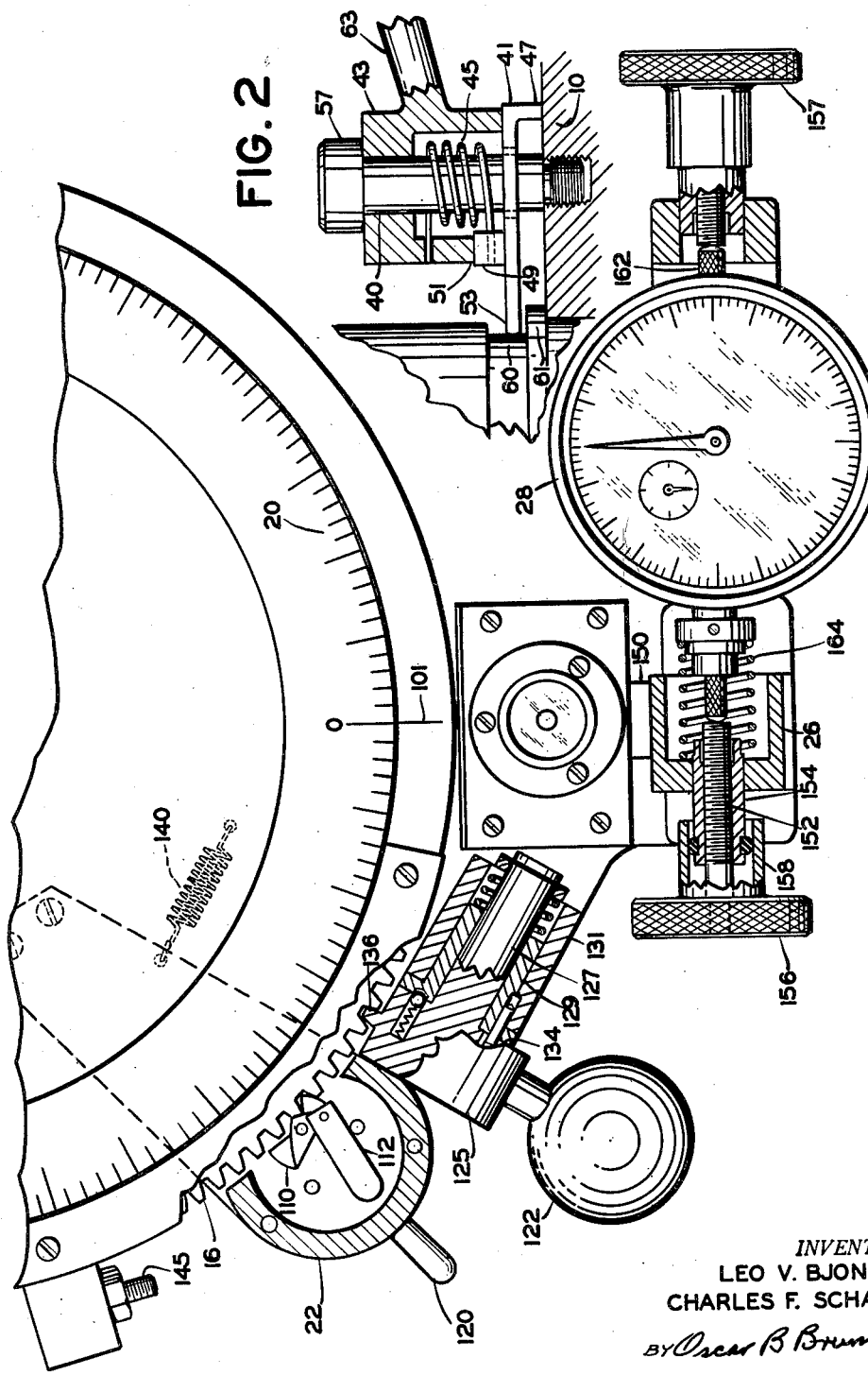

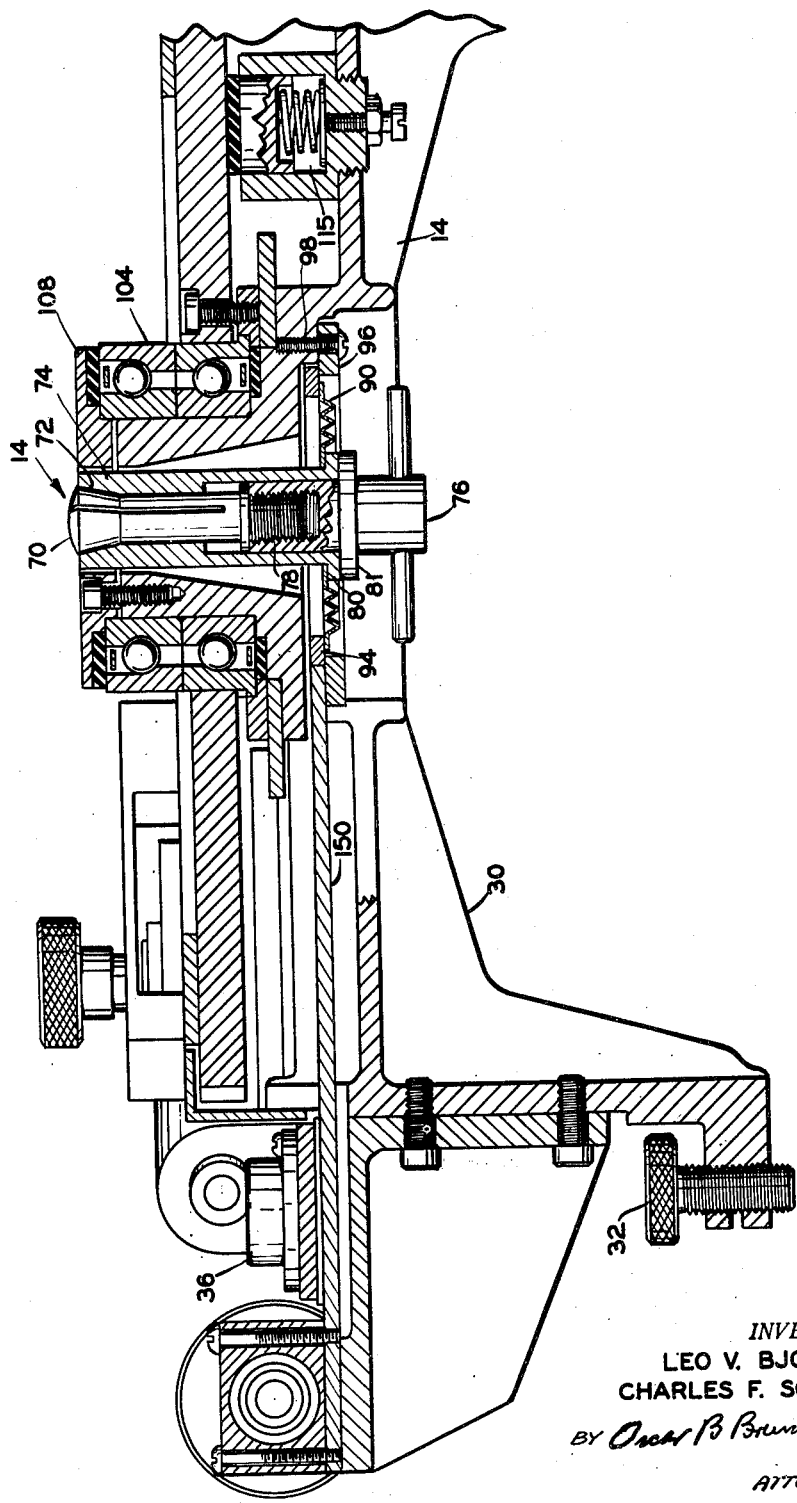

United States Patent Office 2,804,594
Patented Aug. 27, 1957

2,804,594
TEST APPARATUS

Leo V. Bjong, West Englewood, and Charles F. Schafer, Glen Rock, N. J., assignors to Bendix Aviation Corporation, Teterboro, N. J., a corporation of Delaware Application March 30, 1953, Serial No. 345,584

15 Claims. (Cl. 324—158)

This invention relates generally to testing apparatus and more particularly to apparatus for testing electrical signal generators.

Control systems frequently use inductive devices of the synchro type in which a rotor inductively coupled with a stator is angularly displaceable relative to the stator to develop a control signal corresponding to the angular displacement. So that these signal developing devices may be interchangeable for maintenance purposes, they are checked against a standard signal generator. However, the standard signal generator must itself first be calibrated as to the magnitude of the signal developed per degree of displacement.

The present invention contemplates a novel apparatus for calibrating a standard signal generator by indexing one portion of the generator relative to the other by predetermined increments in which compensation is made for initial zero position adjustments for the signal generator and indexing apparatus and for lack of concentricity of the two elements of the generator.

An object of the present invention, therefore, is to provide a novel apparatus for testing signal generators of the synchro type.

Another object is to provide a novel apparatus for the controlled angular displacement of one part of a two-part device relative to the other.

Still another object is to provide a novel apparatus for angularly displacing one part of a coaxial two-part device relative to the other by predetermined amounts.

A further object is to provide a novel holding means for testing apparatus.

A still further object is to provide a novel means for engaging individually the two parts of a two-part substantially concentric device so that the normal axial relationship of the two parts is not changed.

The foregoing and other objects and advantages of the present invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the drawings wherein like parts are numbered alike:

Figure 2 is a sectional view of a clamp of the adapter of Figure 1;

Figure 3 is an elevational view of the novel apparatus of Figure 1 with certain sections broken out; and Figure 4 is a plan view of the novel apparatus of Figure 1 with certain portions broken out.

Figure 1:
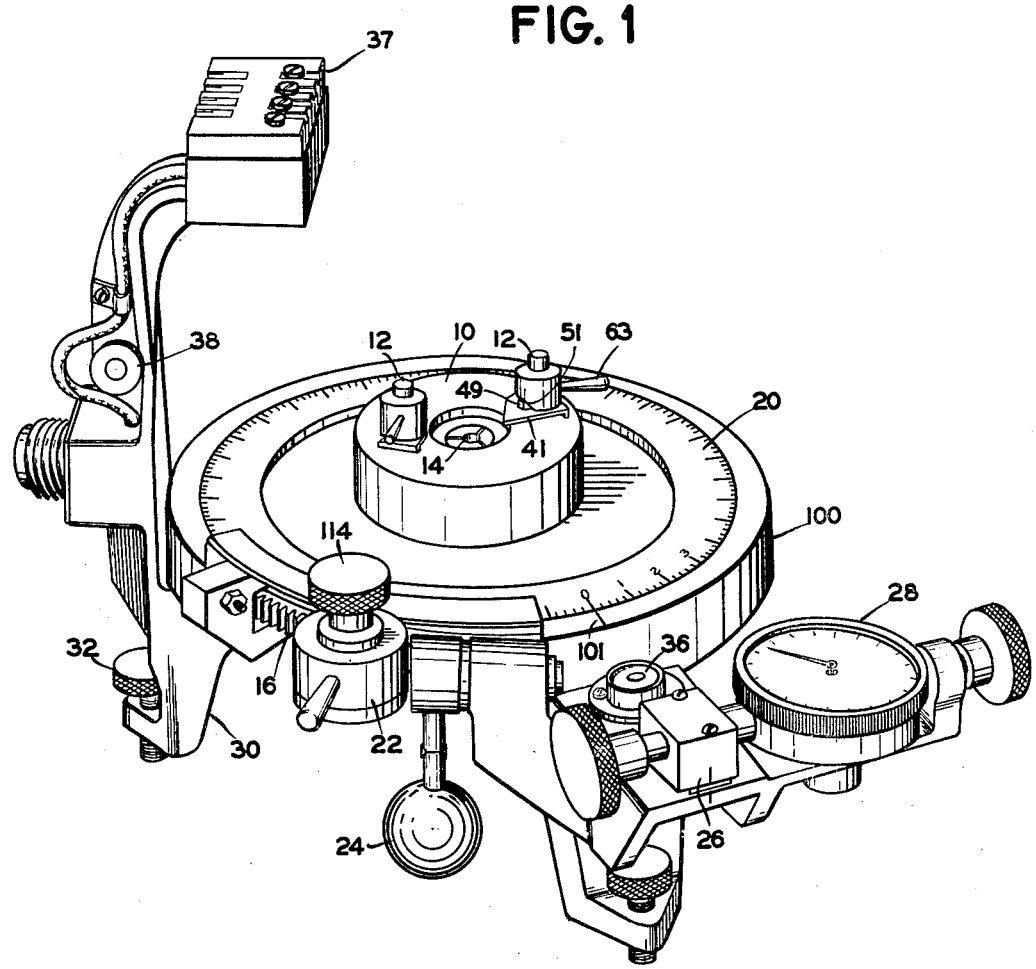
Figure 1 is a perspective view of the novel testing apparatus of the present invention.

Referring to Figure 1 of the drawings, the novel testing apparatus is comprised generally of an adapter 10 with clamps 12 for holding the stator or outer portion of a synchro, a chuck 14 for engaging the shaft of the rotor or inner portion of a synchro, an indexing gear 16 for moving the stator relative to the rotor and indicia 20 for indicating the angular displacement, an actuator 22 with lever 24 for indexing the gear and rotor, and a correction device 26 including a gauge 28 for initially zeroing the rotor relative to the stator. These elements are supported on a three-legged table 30 which has adjusting screws 32 for adjusting the table to a level position as indicated by a bubble level 36. The electrical leads are connected to a terminal block 37 which is pivoted at 38 to handle various size synchros.

Adapter 10, secured to the indexing gear 16, forms a base for the clamps 12 which engage the housing of the synchros. As shown in Figure 2, each clamp is comprised generally of a post 40 fixed to the adapter, a dog 41, a lock 43 and a spring 45. Dog 41 is angularly displaceable on post 40 and has a foot 47 engaging the adapter. A projection 49 on dog 41 engages with a cam slot 51 of lock 43, and a jaw 53 engages with the synchro housing. Lock 43 abuts both stop 57 on post 40 and dog 41 including its projection 49. A helical spring 45 urges dog 41 to follow the angular displacement of lock 43.

Generally, the housing of the synchro to which the stator is fixed has a groove 60 and a flange 61. In operation, the synchro is placed in adapter 10 so that flange 61 rests on adapter 10 and handle 63 of lock 43 is displaced angularly. Spring 45 constrains dog 41 to follow this angular movement until the jaw 53 engages the synchro housing whereupon its angular displacement stops. As the angular displacement of the handle is continued, cam edge 51 bearing against projection 49 tilts dog 41 downwardly, clamping flange 61 of the synchro against adapter 10. Although but two of these clamps are shown in the drawing, it is obvious that others may be employed as desired.

Chuck 14, Figure 3, for engaging the rotor of the synchro, is comprised of a conventional split collet 70 whose jaws coact with a conical surface 72 of a post 74 to close upon the shaft of the rotor of the synchro as a handle 76 is turned so that threads 78 pull the collet into the conical portion; flanges 80 and 81 restraining post 74 and handle 76 against relative axial movement.

Due to manufacturing tolerances, the rotor and the stator of the synchro may not be exactly parallel. Under these conditions should clamps 12 hold the stator in an exact vertical position and chuck 14 hold the rotor in an exact vertical position, a slight distortion would occur between the two elements. This may vary the electrical field and give erroneous results. To obviate this, chuck 14 is floatingly mounted. A corrugated metallic diaphragm 90 secured as by soldering to ring 94 and post 74 supports the post so that any eccentricities are taken up by the displacement of the corrugations of the diaphragm. Ring 94 is mounted for oscillation on a retaining ring 96 which is secured to table 30 by screws 98.

The adapter 10 is moved relative to the chuck 14 by the indexing gear 16. Fixed to gear 16 is a suitably calibrated dial 20 which indicates the angular displacement relative to a mark 101 on a shield 100. This shield is fastened to support 30 and protects the teeth of the gear. The gear is journalled on table 30 by bearings 104 which are preloaded by a suitable clamp 108.

Actuator 22 with lever 24 indexes gear 16. This actuator, Figure 4, has a conventional pivoted pawl 110 engageable with the teeth of the gear. An arm 112, which is suitably attached to knob 114, Figure 1, pivots the pawl so that the gear may be indexed in either direction. As is well known in such pawl mechanisms, the pawl will slip over the teeth without moving the gear when the pawl is moved in one direction yet will engage the teeth to move the gear when it is moved in the opposite direction. A suitable friction device such as a leather faced clutch 115, Figure 3, provides the necessary resistance on gear 16 so that pawl 110 can slip on the teeth without moving the gear. The actuator 22 may be moved either by a handle 120 or by a lever 24.

Lever 24 rotates a member 125 about a spindle 127 which is journalled in a bearing 129 in a bracket 131 fixed to support 30. Member 125 has a cam edge 134 engaging the edge of bearing 129 such that as the lever 24 is moved upward, member 125 is moved to the left. A gear sector 136 moves out of engagement with the teeth of gear 16 at the same time, and pawl 110 engages a new tooth of gear 16. As the lever 24 is lowered, member 125 moves back to the right; a spring 140 connecting the actuator 22 and support 30 pulls the actuator to the right, indexing the gear one tooth; and gear sector 136 engages a tooth locking the gear in this position. In order that rough operation of lever 24 will not injure a tooth, the shaft connecting knob 122 and member 125 consists of two portions interconnected by a leaf spring.

Actuator 22 may also be moved manually by its handle 120 to engage a fixed number of teeth. In this event, it is moved to the left until it engages a stop 145. Pawl 110 again engages a tooth at this position and as spring 140 returns the actuator to its initial position, it indexes a set number of teeth.

In order that the rotor and stator may initially have their null or zero position set at a zero gear position, the ring 94, Figure 3, to which diaphragm 90 is connected, has an arm 150 extending outwardly through a slot in table 30. This arm terminates in compensating portion 26. Referring to Figure 4, the compensating portion 26 has an adjusting screw consisting of a rod 152 which is threaded in a shaft 154 fixed to portion 26. A knob 156 secured to rod 152 rides on shaft 154 by way of a friction ring 158. The indicating gauge 28 may be a conventional displacement gauge having a shaft 162 extending through the gauge. This gauge may be made to read directly in seconds by calculating the travel of compensator 26 for each second of movement of chuck 14 and calibrating the gauge accordingly. Shaft 162 and compensator 26 are held together by a tension spring 164. As knob 156 is turned, compensator 26 is forced to the left of shaft 162 to make adjustments so that the initial zero position of the rotor and stator will be correlated with the zero position of mark 101 and indicia 20.

In testing a synchro device, the shaft of the rotor is placed in chuck 16 and handle 76 is turned until the chuck securely grasps the shaft. The electrical leads of the synchros are attached to terminal block 37 and a suitable measuring device connected thereto. The stator is moved in adapter 10 until a null position is reached, and the handles 63 of locks 43 are angularly displaced so that dogs 41 clamp the stator against adapter 10 at this position. Knob 156 and knob 157 are turned until shaft 162 and arm 150 are in such position that the indicator of gauge 28 registers zero and the rotor and stator of the synchro are at a null position. Knob 114 of indexing device 22 is turned to position pawl 110 to move gear 16 in the proper direction as lever 24 is moved upwardly and downwardly so that the stator will be indexed one gear tooth each time. Electrical measurements can then be taken for each position of the stator relative to the rotor and the signals recorded for each displaced position.

The foregoing then has presented a novel indexing apparatus in which two concentric elements may have one element displaced by predetermined increments relative to the other element. Compensation is readily made for initial disparities between the zero position of one element with respect to the other and provision is also made for any lack of concentricity of the two elements.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. Apparatus for holding an object comprising a base, a member mounted on said base for axial and angular movement relative thereto and having a jaw adapted to engage said object, control means mounted on said base coaxially with said member for angular movement relative to said base, resilient means interconnecting said member and said control means for urging said member to move angularly with said control means whereby said jaw engages said object, and means operative upon continued angular displacement of said control means for moving said member axially to hold said object against said base.

2. Apparatus for holding an object comprising a base, a control means displaceable about an axis angularly relative to said base, and a member displaceable angularly about said axis and tiltable axially relative to said base, said member having a foot for engaging said base, a jaw for engaging said object, and a means for engaging said control means, said control means having a cam means for engaging said last-named means whereby as said control means is displaced angularly relative to said axis said member is displaced axially to engage said object whereupon further angular movement of said control means tilts said member on said foot to hold said object against said base.

3. Apparatus for holding an object comprising a base, a control means displaceable angularly about an axis relative to said base, a member displaceable angularly about said axis and axially relative to said base, and resilient means operatively connecting said control means and said member for urging said member to follow the angular displacement of said control means, said member having a foot for engaging said base, a jaw for engaging said object, and a means for engaging said control means, said control means having a cam means for engaging said last-named means whereby as said control means is displaced angularly relative to said member, said member is displaced angularly to engage said object whereupon continued angular movement of said control means displaces said member axially to hold the object against said base.

4. Apparatus for holding an object comprising a base, a post mounted on said base, a first member mounted on said post for rotation thereon, a second member mounted on said post for axial and angular motion relative thereto, and resilient means interconnecting said first and second members for urging said second member to follow the rotation of said first member, said second member having a foot for engaging said base, a jaw for engaging said object and a means for engaging said first member, said first member having a cam means for engaging said last-named means, whereby said first and second members are rotated about said post together until said second member engages said object and thereafter said first member is displaced angularly relative to said second member, and the coaction of said cam and engaging means causes said second member to be displaced axially to hold said object against said base.

5. Apparatus for holding a two-part substantially concentric object comprising a base, first means movable axially and angularly about an axis relative to said base and having a jaw adapted to engage one part of said object, second means movable angularly about said axis relative to said base for moving said first means angularly and axially whereby said jaw engages said one part of said object and holds it against said base, third means adapted to engage said other part of said object, and means operatively connecting said third means and said base for compensating for any lack of concentricity of said parts.

6. Apparatus for holding a two part substantially concentric object comprising a base, a first member movable axially and angularly about an axis relative to said base and having a jaw adapted to engage one part of said object, means movable angularly about said axis relative to said base for moving said first member angularly and axially whereby said jaw engages said one part and holds it against said base, a second member adapted to engage said other part of said object, and a flexible diaphragm operatively connecting said second member and said base for compensating for any lack of concentricity of said parts.

7. Apparatus for holding a two-part substantially concentric object comprising a support, a base mounted on said support, a first member movable axially and angularly relative to said base and having a jaw adapted to engage one part of said object, means movable angularly relative to said base for moving said member angularly and movable angularly relative to said member to move the latter axially whereby said jaw engages said one part and holds it against said base, a second member adapted to engage said other part of said object, and means operatively connecting said second member and said support for compensating for any lack of concentricity of said parts.

8. Apparatus for holding a two-part substantially concentric object comprising a support, a base mounted on said support, a first member movable axially and angularly relative to said base and having a jaw adapted to engage one part of said object, means movable angularly relative to said base for moving said member angularly so that said jaw engages said one part and movable angularly relative to said member so the said jaw holds said object against said base, a second member adapted to engage said other part of said object, means operatively connecting said second member and said support for compensating for any lack of concentricity of said parts, and means for moving said base relative to said support.

9. Apparatus for holding a two-part substantially concentric object comprising a support, a base mounted on said support, a first member movable axially and angularly relative to said base and having a jaw adapted to engage one part of said object, means movable angularly relative to said base for moving said member angularly and axially whereby said jaw engages said one part and holds it against said base, a second member adapted to engage said other part of said object, means operatively connecting said second member and said support for compensating for any lack of concentricity of said parts, and means operatively connecting said second member and said support for compensating for a predetermined position of one part relative to the other part at a predetermined position of said base.

10. Apparatus for holding a two-part substantially concentric object comprising a support, a base mounted on said support, a first member movable axially and angularly relative to said base and having a jaw adapted to engage one part of said object, means movable angularly relative to said base for moving said member angularly and axially whereby said jaw engages said one part and holds it against said base, a second member adapted to engage said other part of said object, means operatively connecting said second member and said support for compensating for any lack of concentricity of said parts, means operatively connecting said second member and said support for moving said second member to compensate for a predetermined position of one part relative to the other part at a predetermined position of said base, and means for moving said base angularly by predetermined increments.

11. Apparatus for holding a two-part substantially concentric object comprising a support, a base mounted on said support, a first member movable axially and angularly relative to said base having a jaw adapted to engage one part of said object, means movable angularly relative to said base for moving said member angularly and axially whereby said jaw engages said one part and holds it against said base, a second member adapted to engage said other part of said object, means operatively connecting said second member and said support for compensating for any lack of concentricity of said parts including an arm extending from said last-named means, and means to adjust the position of said arm to move said other part to a predetermined position relative to the one part at a predetermined position of said base.

12. Apparatus for holding a synchro device having a rotor and a stator, comprising a support, a base mounted on said support, a first member movable axially and angularly relative to said base and having a jaw adapted to engage the stator of said synchro device, means movable angularly relative to said base for moving said member angularly and axially whereby said jaw engages said stator and holds it against said base, a second member adapted to engage said rotor, means operatively connecting said second member and said support for compensating for any lack of concentricity of said rotor and stator, means connected to said last-named means including an arm extending from said last-named means, and means to adjust the position of said arm to bring said rotor to a predetermined position relative to said stator at a predetermined position of said base.

13. Apparatus for holding a synchro device having a rotor and a stator, comprising a support, a base rotatably mounted on said support, a first member movable axially and angularly relative to said base and having a jaw adapted to engage the stator of said synchro device, means movable angularly relative to said base for moving said member angularly and axially whereby said jaw engages said stator and holds it against said base, a second member adapted to engage said rotor, means operatively connecting said second member and said support for compensating for any lack of concentricity of said rotor and stator, means connected to said last-named means including an arm extending from said last-named means, and means to adjust the position of said arm to bring said rotor to a predetermined position relative to said stator at a predetermined position of said base, and means for rotating said base by predetermined increments.

14. Apparatus for indexing one part of a two-part object relative to the other, comprising a support, a base mounted on said support for angular movement relative thereto, a post on said base, said post having a first member angularly movable thereon and a second member angularly and axially movable thereon, means for urging said second member to follow angularly said first member, means interconnecting said first and second members for urging said second member axially to hold one part of said object against said base upon relative angular movement of said two members, a third member adapted to engage said other part of said object, means for resiliently connecting said third member and said support, means for moving said base angularly relative to said support by predetermined increments, and means for moving said resilient connecting means relative to said support whereby a predetermined position of said two parts may set at a predetermined position of said base.

15. Apparatus for testing a synchro device having a rotor and a stator, comprising a support, a base mounted on said support for angular movement relative thereto, a post on said base, said post having a first member angularly movable thereon and a second member angularly and axially movable thereon, means for urging said second member to follow said first member angularly, means interconnecting said first and second members for urging said second member axially to hold said stator upon relative angular movement of said two members, a third member adapted to engage said rotor, means for resiliently connecting said third member and said support, means for moving said base angularly relative to said support by predetermined increments, and means for moving said resilient connecting means relative to said support whereby a predetermined position of said rotor and stator may set at a predetermined position of said base.

References Cited in the file of this patent

UNITED STATES PATENTS

| | | |
|---|---|---|
| 2,126,342 | Nippert | Aug. 9, 1938 |
| 2,405,060 | Scofield | July 30, 1946 |
| 2,430,613 | Hodge | Nov. 11, 1947 |
| 2,524,507 | Anthony | Oct. 3, 1950 |